United States Patent Office 3,206,543
Patented Sept. 14, 1965

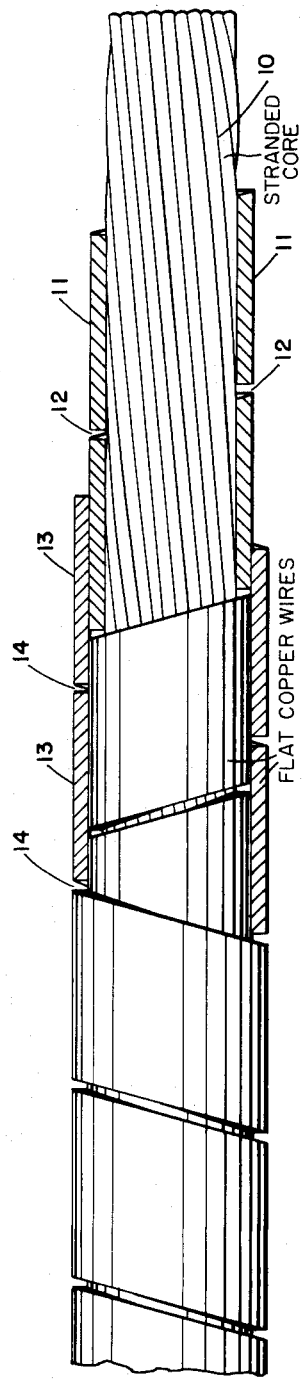

3,206,543
COPPER WRAPPED CABLE
William J. Gilmore, Manitou Beach, Mich., assignor to American Chain & Cable Company
Filed May 10, 1963, Ser. No. 279,407
1 Claim. (Cl. 174—130)

This invention relates to cable of high tensile strength and electrical conductivity and, more particularly, to a cable suitable for such use as an aircraft antenna characterized by double layer counter-wound wrappings of flat copper wire about a tensile load-bearing inner core element.

Since a drogue is pulled along behind its towing aircraft by a length of stranded steel cable which may be several thousand yards long, the tow cable has the potential of serving as a highly effective antenna for reception and transmission of radio signals. However, the electrical conductivity of conventional tensile load-bearing stranded steel cable is insufficient for use as high frequency antenna and it must be increased by the addition of conductive elements to the cable structure. But at the same time no very appreciable increase may be made to the weight per unit length of the tow cable or to its thickness because of the already severe demands upon its tensile strength. A composite cable of large diameter encounters extreme wind resistance at high velocities which adds enormously to the stress put upon it during use, and this load coupled with its own weight and the weight and drag of the drogue can become prohibitively great for known cable designs. Nowhere in the prior art in this field is there any electrically conductive cable structure which is adequately light in weight and thin in longitudinal cross section to serve as a satisfactory load-bearing and current-carrying tow cable and antenna combination.

A structure of such properties is achieved by the present invention which provides a cable of high tensile strength and electrical conductivity suitable for use as an antenna or the like. The new cable comprises a tensile load-bearing inner core element which advantageously may be made of long lay helically twisted steel wire strands. At least one first strip of flat copper wire is helically wrapped about this core element. Also at least one second strip of flat copper wire is helically wrapped about the first strip in a lay which is opposite in direction to that of the first strip. Each strip may be wrapped in a plurality of successive slightly spaced turns.

One of the primary features of this cable design is the double counter-wound layers of flat copper wire wrapped about the inner core element. Because of the tendency of current to flow along the outer layer or "skin" of a conductor, and also because of the superior conductivity of copper as compared to the steel of the inner core, the two layers of flat copper carry most of the current when the cable is used as an antenna. The counter-wound disposition of these strips is responsible for an exceptionally high conducting efficiency because of the short current path which they provide. Since the strips of each layer cross one another at a multiplicity of points, it is unnecessary for a current to follow a helical path throughout the length of the cable. Instead it can be conducted from one layer to the next where the two counter-wound strips cross and thus proceed substantially longitudinally along the length of the cable. A further electrical advantage of the counter-wound strips is that any self-inductance in the cable created by the coil effect of each strip is cancelled out.

From the standpoint of physical properties, the new cable defines the least possible longitudinal cross section due to the thinness of the complementary current-carrying strip elements. Consequently, the wind resistance presented by the cable when used as a tow line is not seriously increased by the incorporation of the copper strips, nor is the weight per unit length of the composite cable at an excessive level. Therefore, an inner load-bearing core element of a given maximum strength can carry the outer elements which make the cable useful as an antenna and still avoid failure under stress when pulling a target drone.

A preferred embodiment of the new cable is shown in the accompanying drawing which is a longitudinal fragmentary section partly broken away.

An inner core element 10 in this embodiment of the new copper wrapped cable is a 1 x 19 or similar construction strand of round or shaped steel wires. The lay of the outer wires in the inner core 10 is approximately 8 times the core diameter. Helically wrapped throughout the length of the core 10 is a single first strip of flat copper wire 11. In this embodiment, the wire 11 may typically be .017 inch thick and about one-eighth inch wide. Slight inter-turn gaps 12 may be left between successive convolutions of the flat wire 11 to prevent the copper wrapping from acting as a column and reducing the flexibility of the cable. The lay of the first copper wire 11 is equal in direction to the layer of the outer wires in the inner core 10 but is much shorter in extent, about 1.4 times the diameter of the core 10.

The first copper wire 11 is wrapped throughout its length with a second flat copper wire 13 which also may be .017 inch thick and about one-eighth inch wide. Gaps 14 again are left between successive turns of this copper wrapping so as to preserve the flexibility of the cable. The lay of the second copper wire 13 is substantially equal to that of the first copper wire 11, and may be slightly less only because the diameter of the helix of the wire 13 is greater. In this embodiment, the second strip has a lay about 1.2 times the diameter of the core 10. Most importantly, the lay of the second copper wire 13 is opposite in direction to that of the first copper wire 11 so that the two strips are counter-wound and cross one another at a multiplicity of points. In order to locate these double layers tightly about the inner core, each layer may be swaged in place after it is wrapped.

When put to use as a combined tow line and antenna for aircraft, this cable construction possesses virtually all of the properties which are required for the dual functions. In regard to strength, the high tensile strength of the stranded inner core 10 will not be exceeded by the very slight added weight and wind drag resulting from the two layers of flat copper wire 11 and 13. The pliability of the composite cable also experiences no decrease because of the slight inter-turn gaps 12 and 14 which are left in each wrapped strip. Thus the physical ability of the new cable to serve as a tensile load-bearing target tow line is not diminished.

The electrical properties of the composite cable described above are vastly superior than they would be if only the inner stranded core 10 were used, and it is for this reason that the cable also serves admirably as an antenna for transmitting and receiving high frequency radio signals. Comparative tests have shown that with only one helical wrapping of flat wire which is of steel rather than copper, the electrical efficiency of the cable is in the order of twenty percent. If the strip is aluminum, this efficiency is raised to twenty-nine percent. By making such a single wrapping of copper rather than steel or aluminum, this efficiency may be increased to approximately thirty-five percent. However, by doubling the strip of flat copper wire and counter-winding both strips in accordance with this invention the antenna efficiency of the construction exceeds seventy percent, which is all out of proportion to the increase in conductive weight and area added to the cable. This unexpected result is due principally to the counter-wound nature of the double wrapping which permits currents to flow from one turn to the next substantially longitudinally throughout the cable without following the much longer helical path of either one flat wire. Also, the performance of the new cable as a high frequency antenna is enhanced by its avoidance of appreciable self-inductance which otherwise exists from the coil effect of one helically wrapped flat wire. Since the lay of the two wires are opposite in direction, their respective coil effects and self-inductance tend to cancel one another out rather than to be cumulative.

I claim:

A cable of high tensile strength and electrical conductivity, comprising a tensile load-bearing inner core element and at least two strips of flat copper wire helically wrapped tightly one over the other in opposite directions about and in engagement with the core element in successive turns spaced freely apart to permit the strips to bend about the centerline of the cable when the cable is flexed, each of said copper strips being radially compressed in place about the core element.

References Cited by the Examiner

UNITED STATES PATENTS

| | | | |
|---|---|---|---|
| 1,760,409 | 5/30 | Howe | 174—128 |
| 2,662,931 | 12/53 | Mougey | 174—107 |

FOREIGN PATENTS 349,415    5/51    Great Britain.

JOHN F. BURNS, *Primary Examiner.*

DARRELL L. CLAY, JOHN P. WILDMAN, LARAMIE E. ASKIN, *Examiners.*